United States Patent [19]

Rothstein

[11] Patent Number: 5,057,844
[45] Date of Patent: Oct. 15, 1991

[54] INSULATED UNDERGROUND ANTENNA AND METHOD FOR UTILIZING SAME

[76] Inventor: Mark B. Rothstein, c/o Philadelphia Electric Co. 2301 Market St. P.O. Box 8699, Philadelphia, Pa. 19101

[21] Appl. No.: 495,473

[22] Filed: Mar. 19, 1990

[51] Int. Cl.⁵ .................. G01S 13/80; G01V 3/12; H01Q 1/04

[52] U.S. Cl. .................................. 342/51; 342/22; 324/329; 340/572; 343/719

[58] Field of Search ............ 342/5, 22, 51, 187; 324/329; 343/719, 873, 895; 340/572

[56] References Cited

U.S. PATENT DOCUMENTS

| | | | |
|---|---|---|---|
| 1,795,534 | 3/1931 | Wyrick | 343/719 X |
| 2,750,321 | 6/1956 | Koppelman | 343/873 X |
| 3,216,016 | 11/1965 | Tanner | 343/741 |
| 3,836,942 | 9/1974 | Zimmermann et al. | 324/329 X |
| 4,028,707 | 6/1977 | Young et al. | 343/719 |
| 4,062,010 | 12/1977 | Young et al. | 342/22 X |
| 4,334,227 | 6/1982 | Marks | 343/719 |
| 4,642,640 | 2/1987 | Woolsey et al. | 340/572 X |
| 4,682,180 | 7/1987 | Gans | 343/873 X |
| 4,761,656 | 8/1988 | Cosman et al. | 343/719 |
| 4,783,666 | 11/1988 | Ast et al. | 343/872 |
| 4,792,812 | 12/1988 | Rinehart | 343/873 X |
| 4,811,030 | 3/1989 | Pedersen | 343/788 |

FOREIGN PATENT DOCUMENTS 2437464  2/1976  Fed. Rep. of Germany ........ 342/22

*Primary Examiner*—Gilberto Barrón, Jr.
*Attorney, Agent, or Firm*—Paul & Paul

[57] ABSTRACT

A passive inductively and capacitively loaded antenna is shown which is retained within a closed cel styrene foam enclosure. A method for detecting buried utility components utilizing such in combination with underground radar is also shown.

4 Claims, 1 Drawing Sheet

INSULATED UNDERGROUND ANTENNA AND METHOD FOR UTILIZING SAME

FIELD OF THE INVENTION

This invention relates to methods and apparatus for detecting underground utility components. More particularly, the present invention relates to passive antennas, their placement alongside buried utility components, and the method of detecting those components by reflecting radar off of the passive antennas.

BACKGROUND OF THE INVENTION

The use of radar to detect buried or underground utility components is generally known in the art. U.S. Pat. No. 4,062,010 discloses a detector which utilizes a very short pulse radiated into the ground. The reflection is received and converted to be operated on and analyzed.

The '010 patent, which disclosure is incorporated herein by reference, is utilized to detect non-metallic pipes utilized in the transfer of natural gas. The detection of those non-metallic pipes, due to the material used in their construction, is difficult and subject to inaccuracy from ground effects, including underground rocks, streams, and mineral deposits.

Therefore, rather than attempting to detect buried or underground utility components such as non-metallic pipes, it might be more desirable to place inexpensive marker devices or passive antennas which effectively reflect radar near the components. This detection method relies on the reflectivity of the passive antenna, rather than the component. Because the passive antenna can be constructed for maximum reflectivity, this is an effective, accurate and consistent method of detection.

Insofar as these passive antennas or marker devices are to be utilized in a number and variety of locations, and in the case of detecting pipes, to be utilized at various places along the length of the pipes, it is desirable that they be inexpensive, easy to manufacture and capable of effectively reflecting signals of a narrow bandwidth only. This last characteristic would provide for different reflective "signatures" from differently tuned antennas and thus for identification of the type and location of the marked structure. It is also desirable that the antenna be insulated from any environmental forces which may affect the antenna. For example, moisture or soil contact may interfere with the antenna's reflectivity and longevity.

Therefore it is an object of the present invention to provide a protected passive antenna for burying near or next to utility components.

It is a further object of the present invention to provide a protected passive antenna for burying near or next to utility components which is inexpensive and easy to manufacture.

It is a further object of the present invention to provide a protected passive antenna which is capable of being selectively loaded in order to reflect "signatures" from signals with differing frequencies.

DESCRIPTION OF THE PREFERRED EMBODIMENT

Figure 1:
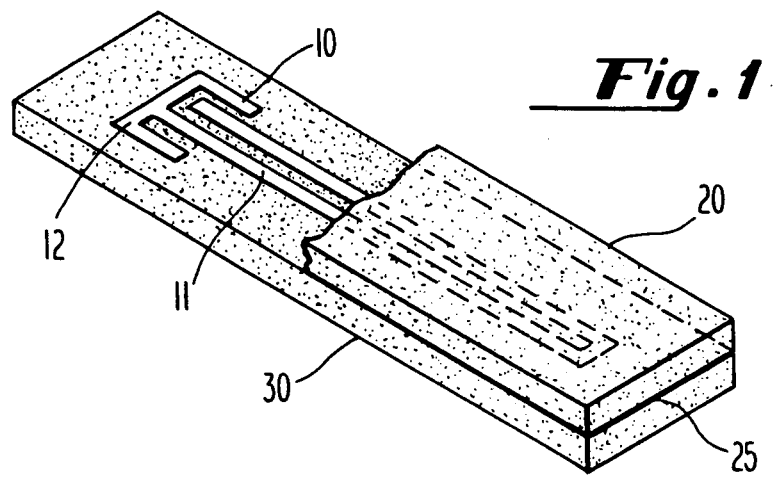
FIG. 1 illustrates a plan view of one embodiment of the invention, with a cutaway illustrating the internal features.

A preferred embodiment of the invention is shown generally in FIG. 1. The passive antenna 10 is shown retained within closed cell styrene foam. The styrene foam enclosure shown has a rectangular shape, although any shape may be used which does not interfere with the operation or ease of placement of the antenna. In this embodiment, layers 20 and 30 of closed cell styrene foam sandwich the passive antenna 10. Closed cell styrene foam, is both water and soil resistant and relatively stable in both structure and composition. Additionally, the foam has a high dielectric, which assists in propagation of the reflected signal. Styrene foam is also relatively inexpensive. Due to these characteristics closed cell styrene foam is preferred as an enclosure material, although any other material with similar characteristics may be used.

The adhesive 25 holding the layers 20 and 30 together may be of any type commonly known in the art, so long as it is sufficiently water resistant and creates a sufficiently strong bond so the characteristics of the styrene foam sandwich are not compromised. Furthermore, the adhesive is desirably electrically neutral, so as not to interfere in the reflection of the radar signal.

The antenna 10 is an elongated strip in shape and is constructed of aluminum foil, which again permits a relatively inexpensive construction. The shape of the antenna and material used can, of course, be any shape and material known in the art to produce an effective reflection of radar. Capacitative and inductive loading is accomplished by the T-shaped head 12 acting as a lumped capacitor, and the U-shaped body 11 acting as an inductor.

Capacitive or inductive loading or both is not essential to the antenna, but it permits the actual length of the antenna to be shorter than the necessary frequency. For example, a non-loaded quarter wave antenna designed to reflect radar at 125 MHZ would have to be 3.9 feet long. Loading permits the size to be reduced to less than 2 feet. Loading also gives the antenna a high "Q", that is, the ratio of reactance of the antenna to its resistance is high and the antenna reflects well within narrowly defined bands, usually only from 1 to 2 percent around its frequency. This of course permits the antenna to sharply reflect the signal, as well as permit a number of antennas with differing band widths to mark a number of relatively close different components, or, differing locations on the same components. For example, where a natural gas pipe and a power cable are buried proximate each other, it might be desirable to mark the pipe with antennas reflecting in the 125 MHz range, and the cable with antennas reflecting in the 150 MHz range.

Figure 2:
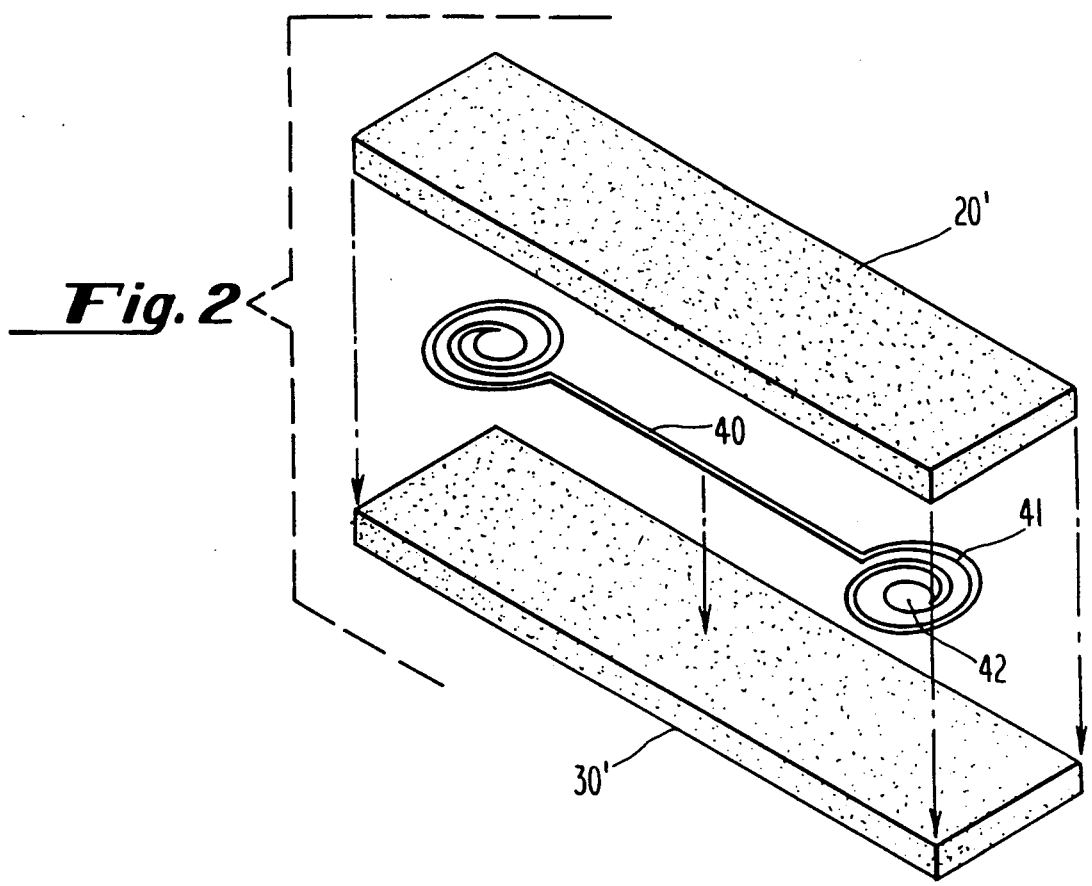
FIG. 2 illustrates an exploded view of another embodiment of the present invention.

Turning now to FIG. 2, another embodiment is seen. The antenna 40 is again sandwiched between layers 20' and 30'. The adhesive is not shown. The antenna 40 is again essentially an elongated strip. The spiral coils 41 in this embodiment act as lumped inductors and the disks 42 act as capacitors, resulting in an antenna that is both inductively and capacitively loaded.

Figure 3:
FIG. 3 illustrates in side view yet another embodiment.

FIG. 3 illustrates a passive antenna 50 retained within a block of styrene foam 51 although of course any shape may be utilized which does not interfere with the operation or ease of placement of the antenna. Utilization of a single piece or block of foam, and the encapsulation of the antenna in the foam as the foam is formed or made, ensures protection of the antenna from the elements since there is no adhesive sealant involved. Additionally, such an embodiment results in a simpler and therefore less expensive construction, as the encapsulation can occur during the manufacture of the foam.

The above description and the views depicted in the Figures are for purposes of illustration only and are not intended to be, and should not be construed as, limitations on the invention. In particular and without limitation, terms such as inside, outside, right, left, etc. and derivatives thereof have been used for purposes of clarity in describing the invention only and it is to be understood that particular orientations will depend on upon the use of the invention in a particular circumstance. Moreover, certain modifications or alternatives may suggest themselves to those skilled in the art upon reading of this specification, all of which are intended to be within the spirit and scope of the present invention as defined in the appended claims.

I claim:

1. A device for reflecting radar comprising a passive antenna means retained within a water and soil resistant enclosure means, wherein said antenna means is inductively loaded by coil means.

2. A device for reflecting radar comprising a passive antenna means retained within a water and soil resistant enclosure means, wherein said antenna means is inductively loaded by a loop means.

3. A device for reflecting radar comprising a passive antenna means retained within a water and soil resistant enclosure means, wherein said antenna means is capacitively loaded by disk means.

4. A device for reflecting radar comprising a passive antenna means retained within a water and soil resistant enclosure means, wherein said antenna means is capacitively loaded by a T-shaped head means.

* * * * *